Figure 1:
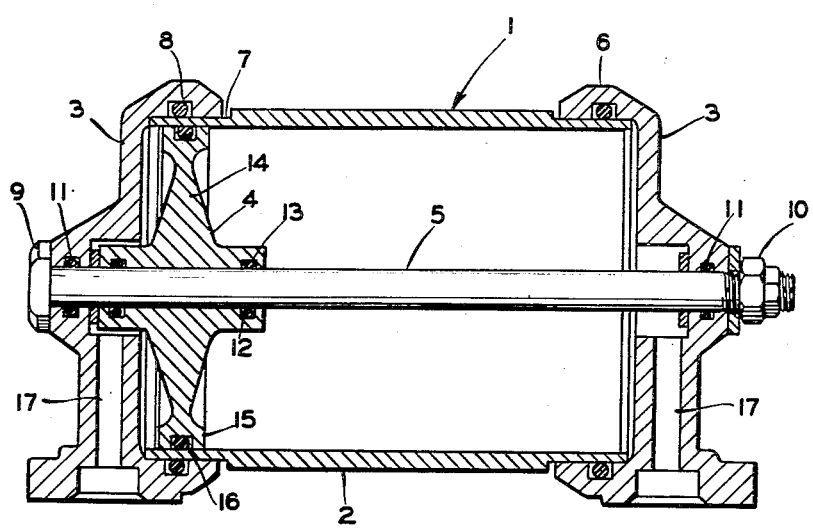

July 30, 1957 W. D. ANTRIM, JR 2,800,924
ACCUMULATOR
Filed Sept. 30, 1953

INVENTOR.
WILLIAM D. ANTRIM JR.
BY
ATTORNEY

2,800,924

ACCUMULATOR

William D. Antrim, Jr., Paramus, N. J., assignor to Bendix Aviation Corporation, Teterboro, N. J., a corporation of Delaware Application September 30, 1953, Serial No. 383,364

3 Claims. (Cl. 138—31)

The present invention relates to fuel tanks and more particularly to a fuel tank adapted to accumulate a measured quantity of fuel.

In certain applications, a fuel tank or accumulator is used, which delivers a contained liquid under the impetus of a second liquid under pressure. In such applications, it is necessary that the liquids be separated. Various types of accumulators having flexible diaphragms have been used to transmit pressure while keeping separate the two fluids. However, when it has been necessary to operate over a wide range of temperatures, these units have failed due to the inability of the diaphragms to stand up under the extreme wide range of temperatures. Other types are those comprising a cylinder and piston which are provided with sealing means for fluid separation. The piston type accumulators are normally long in relation to their diameters, so that the piston L/D ratio can be favorable for prevention of cocking or tilting of the piston.

In certain applications such, for example, as a liquid fuel air turbine type starter, the length is restricted by the space available and in order to get the internal volume desired a poor L/D ratio would have to be used. The present invention overcomes this disadvantage by providing a center rod. The piston need have a L/D ratio favorable only with respect to the small diameter center rod which controls the piston axially and the outer rim of the piston need be only wide enough to contain a sealing ring. This permits the piston to have a large diameter without running into the difficulty of tilting.

It is an object of the invention to provide an improved fuel accumulator.

A further object of the invention is to provide a piston type accumulator in which the diameter can be large with respect to the length.

A further object of the invention is to provide a novel fuel accumulator that is easy to assemble and construct.

A further object of the invention is to provide a fuel accumulator having a novel piston guide arrangement.

The above and other objects and features of the invention will appear more fully hereinafter from a consideration of the following description taken in connection with the accompanying drawings, wherein one embodiment of the invention is illustrated by way of example.

Figure 2:
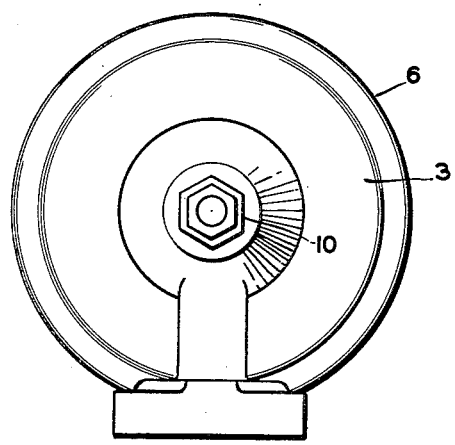

In the drawing:

Figure 1 is a longitudinal cross-sectional view of a fuel accumulator embodying the invention; and Figure 2 is an end view of the accumulator illustrated in Figure 1.

In the drawing, an accumulator is indicated generally by the numeral 1 and has a wall section 2, end caps 3, piston 4 and guide rod 5. The end caps 3 are identical and have a flange portion 6 adapted for a close fit with a step portion 7 of the wall section 2. Sealing rings 8 are provided between the flanges 6 and the section 7.

The piston rod 5 extends through the sections 3 and has a flange 9 on one end and a nut 10 on the other.

The end sections 3 are held on the wall 2 by means of the rod 5, flange 9 and nut 10. Sealing rings 11 may be provided between the rod 5 and the end pieces 3.

The piston 4 has a hub section 12 adapted for a sliding fit on the rod 5. Sealing rings 13 may be provided between the hub 12 and the rod 5. The piston 4 also has a tapered section 14 extending outwardly of the central part of the hub that terminates in a circumferential flange 15 of less length than the base of the tapered section. Sealing means 16 are provided between flange 15 and the inner walls of the member 2.

The hub portion 12 has a length substantially greater than the diameter of the rod 5 and serves as a guide for the piston 4. The flange 15 has a width only sufficient to contain the sealing means 16.

The end members 3 have ports 17 which are adapted to be connected to a pressure supply of liquid and to a fuel supply of liquid (not shown). One of the ports 17 may be connected for example to a source of compressed air (not shown) and the other connected to a source of fuel (not shown). It is to be noted that these passages 17 are comprised of a transverse passage and an axial cavity and that the end of hub 12 abuts the bottom of the axial cavity when the base of the tapered part of the piston is adjacent the cap member.

In operation, upon there being no air pressure or pressure of the propelling liquid, the accumulator will be filled with the fuel liquid from a source (not shown). Upon pressure being applied by the propelling liquid, the piston will be moved axially to expel the fuel liquid from the accumulator. The hub 12 having a length substantially greater than the diameter of the rod 5 serves as a guide for the piston and prevents tipping thereof.

Although only one embodiment of the invention has been illustrated and described, various changes in the form and arrangement of the parts, which will now appear to those skilled in the art, may be made without departing from the scope of the invention.

What is claimed is:

1. A fuel accumulator comprising a cylindrical body section having a cylindrical interior, identical end cap members mounted over the ends of said body section, openings in said end cap members for the passage of fluids into said interior, a rod member extending axially through said body section and having externally-actuated means cooperating with said rod to secure said end caps to said body section to form a unitary structure, a piston member arranged for axial movement relative to said rod member and for dividing said interior into two chambers, said piston member having a hub section of a length substantially greater than the diameter of said rod, and sealing means between said cap members and said body section.

2. A fuel accumulator comprising a cylindrical body section having cylindrical interior, a pair of identical end cap members having flanges extending over each end of said body section, each of said end cap members having an axial cavity and a transverse passage connected to said cavity for the passage of fluids into said interior, a rod extending axially of said body section and having externally-actuated means cooperating therewith to secure said end cap members to said body section to form a unitary structure, a piston member slidable axially on said rod for separating said interior into two parts, said piston member having an elongated hub section of a length substantially greater than the diameter of said rod, and sealing means between the flanges of said cap members and the ends of said body section and between said cap members and said rod.

3. A fuel accumulator comprising a cylindrical body section having cylindrical interior, a pair of identical end cap members having flanges extending over each end of said body section, each of said end cap members having an axial cavity and a transverse passage connected to said cavity for the passage of fluids into said interior, a rod extending axially of said body section and having externally-actuated means cooperating therewith to secure said end cap members to said body section to form a unitary structure, a piston member slidable axially on said rod for separating said interior into two parts, said piston member having an elongated hub section of a length substantially greater than the diameter of said rod, said piston member having a tapered annular section extending outwardly of the central part of said hub section and terminating in a circumferential flange of less length than the base of said tapered section, said hub section being of such diameter and length that the ends thereof abut the bottoms of said axial cavities in said cap members when the base of said tapered section is adjacent said cap member, and sealing means between the flanges of said cap members and the ends of said body section and between said cap members and said rod.

References Cited in the file of this patent

UNITED STATES PATENTS

| | | |
|---|---|---|
| 2,440,065 | Ashton | Apr. 20, 1948 |
| 2,591,441 | Kollsman | Apr. 1, 1952 |

FOREIGN PATENTS

| | | |
|---|---|---|
| 7,419 | Great Britain | Mar. 29, 1904 |